(12) United States Patent
Kobayashi et al.

(10) Patent No.: US 7,550,706 B2
(45) Date of Patent: Jun. 23, 2009

(54) SOLID STATE IMAGING DEVICE AND OUTPUT CIRCUIT THEREOF HAVING A PROTECTING DEVICE

(75) Inventors: Makoto Kobayashi, Miyagi (JP); Shinya Fukuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/935,134

(22) Filed: Nov. 5, 2007

(65) Prior Publication Data
US 2008/0135730 A1 Jun. 12, 2008

(30) Foreign Application Priority Data
Nov. 6, 2006 (JP) ............... P2006-300275

(51) Int. Cl.
*H01L 31/00* (2006.01)
(52) U.S. Cl. .......... 250/214.1; 250/208.1; 250/214 DC; 348/308
(58) Field of Classification Search ............. 250/208.1, 250/214.1, 214 R, 214 DC, 214 SW; 348/281, 348/294, 307, 308
See application file for complete search history.

(56) References Cited
U.S. PATENT DOCUMENTS
5,825,695 A * 10/1998 Hamaguchi ............ 365/189.09
6,316,760 B1 * 11/2001 Koyama ................. 250/208.1

FOREIGN PATENT DOCUMENTS
JP 2002-335449 A 11/2002
JP 2006-165290 A 6/2006

* cited by examiner

*Primary Examiner*—Thanh X Luu
*Assistant Examiner*—Francis M Legasse, Jr.
(74) *Attorney, Agent, or Firm*—Birch, Stewart, Kolasch & Birch, LLP

(57) ABSTRACT

An output circuit of a solid state imaging device comprises: a source follower circuit that amplifies a voltage value signal converted by a charge detecting portion in accordance with an amount of a signal charge stored by each of pixels and outputs the amplified voltage value signal; a reset transistor that discards the signal charge in the charge detecting portion, which had been subjected to formation of the voltage value signal, to a reset drain in an application of a reset pulse; a bias voltage generating circuit that applies a bias voltage, generated from a power supply, through a resistor to a gate of the reset transistor to which the reset pulse is applied from a reset pulse generating circuit through a coupling capacitor; and a protecting device that applies a voltage of the power supply to a node of the gate and the coupling capacitor to charge the coupling capacitor by the power supply when the power supply is turned ON.

5 Claims, 5 Drawing Sheets

RESET PULSE GENERATING CIRCUIT

RESET PULSE GENERATING CIRCUIT

SOLID STATE IMAGING DEVICE AND OUTPUT CIRCUIT THEREOF HAVING A PROTECTING DEVICE

BACKGROUND OF THE INVENTION

1. Field of the Invention

The present invention relates to a CCD (Charge Coupled Devices) type solid state imaging device and an output circuit thereof, and more particularly to a solid state imaging device which can suppress a deterioration in S/N and an output circuit thereof.

2. Description of the Related Art

In a CCD type solid state imaging device, each signal charge detected by each pixel (photoelectric converting device) is transferred to a charge detecting portion (floating diffusion (FD) portion) of an end of a horizontal charge transfer path through the transfer path and the charge detecting portion converts an amount of the signal charge into a voltage value. An output circuit current amplifies a voltage value signal by a three-stage source follower and outputs the signal as a pickup image signal as described in JP-A-2002-335449 and JP-A-2006-165290, for example. A related CCD type solid state imaging device described in JP-A-2006-165290 is illustrated in FIG. 5. The CCD type solid state imaging device illustrated in FIG. 5 includes vertical CCDs 44, horizontal CCDs 46, reading gates 42, and photosensitive units 40 on a semiconductor substrate 50.

FIG. 3 is a circuit diagram showing an example of the related-art output circuit. A signal charge transferred from each pixel which is not shown enters a charge detecting portion (FD portion) 11 provided on an end of a horizontal charge transfer path which is not shown and is converted into a voltage. The voltage is current amplified by a three-stage source follower circuit 12 and is output as a pickup image signal from an output terminal OS.

The signal charge stored in the FD portion 11 and converted into the voltage is discharged to a reset drain (RD) via a reset transistor 13 set in a conducting state by an application of a reset pulse to a gate (RG) of a reset transistor 13.

A proper bias voltage is usually applied to the gate (RG) of the reset transistor 13 through an external circuit. In an example shown in the drawing, the bias voltage is applied by a bias voltage generating circuit 14 provided in an imaging device in order to cause the external circuit to be unnecessary.

The bias voltage generating circuit 14 is constituted by an enhancement type MOS transistor 15 and a depression type MOS transistor 16 which are connected in series between a power supply OD (voltage Vdd) and a ground.

A resistor (for example, 30 kΩ) having a proper magnitude is provided in the imaging device in such a manner that a pulse voltage is properly applied to the reset transistor 13 between a node of both of the transistors 15 and 16 of the bias voltage generating circuit 14 and the reset gate (RG).

Moreover, a coupling capacitor (for example, 0.1 µF) having a proper magnitude is provided between the reset gate (RG) and a reset pulse generating circuit 18 to be an external circuit in such a manner that a pulse voltage is properly applied to the reset transistor 13.

In the output circuit, when the reset pulse generating circuit 18 generates a pulse having a low voltage of [0V/3.3V] and the same pulse is applied to the reset gate RG, the bias voltage is applied to the reset gate RG through a resistor 17. When the source voltage (OD) reaches 15V, therefore, a pulse having a high voltage of [12V/15V] is applied to the reset gate RG.

FIG. 4 is a graph showing a result obtained by carrying out a circuit simulation when a power supply is turned ON in the output circuit of FIG. 3 by using a typical parameter. The case in which a voltage of a power supply (OD, RD) rises from 5V to 15V at 30 µs is calculated.

It is apparent that a rise in a voltage Vrg of the reset gate RG is much gentler than a rise in the supply voltage Vdd. The reason is that a coupling capacitor 19 connected to the reset gate RG is charged through the resistor 17. A time of approximately 2.2 RC (2.2 ms:0.2 ms which is one-tenth of 2.2 ms is shown at a maximum in an axis of abscissas in the graph) is taken before an electric potential of the reset gate RG rises completely.

As a gate voltage Vg1 of an initial stage drive transistor 21 of the three-stage source follower circuit 12, a voltage obtained by adding vth of the reset transistor 13 to a reset gate voltage Vrg is applied. As a result, the time is taken for a rising time of a source voltage Vs1 of the initial stage drive transistor 21.

In the case in which a rise in the electric potential Vrg of the reset gate RG is gentler than a rise in the electric potential of the power supply OD, accordingly, a difference (VDS1) between the power supply OD and a source voltage Vs1 of the initial stage drive transistor 21 is increased immediately after the power supply is turned ON.

In the case in which an electric potential difference VDS1 between a drain and a source is great, thus, a deterioration in a performance of the transistor is caused by the generation of a hot electron. For example, the hot electron collides with a gate film so that an interface state density is generated on an interface of a silicon/gate film and serves as a noise source, resulting in a deterioration in S/N of an image quality of a pickup image.

In order to avoid the deterioration, it is preferable to simply decrease a resistance value of the bias voltage generating circuit 14 or a capacity of the capacitor. However, there is a problem in that an amplitude of a reset pulse is reduced as a side effect. For this reason, it is necessary to quicken the rise in the voltage Vrg of the reset gate without varying the resistance and the capacity.

SUMMARY OF THE INVENTION

It is an object of the invention to provide a solid state imaging device capable of quickening a rise in the voltage Vrg of the reset gate without reducing the amplitude of the reset pulse and an output circuit thereof.

According to an aspect of the invention, there is provided an output circuit of a solid state imaging device comprising: a source follower circuit that amplifies a voltage value signal, the voltage value signal being formed by a charge detecting portion in accordance with an amount of a signal charge stored by each of pixels, and outputs the amplified voltage value signal as a pickup image signal; a reset transistor that discards the signal charge in the charge detecting portion, which had been subjected to formation of the voltage value signal, to a reset drain in an application of a reset pulse; a bias voltage generating circuit that applies a bias voltage through a resistor to a gate of the reset transistor to which the reset pulse is applied from a reset pulse generating circuit through a coupling capacitor, the bias voltage being generated from a power supply; and a protecting device that applies a voltage of the power supply to a node of the gate and the coupling capacitor so as to charge the coupling capacitor by the power supply when the power supply is turned ON.

The protecting device of the output circuit of the solid state imaging device according to the invention may be constituted by an MOS transistor which is connected in parallel with the resistor and is brought into a conducting state to connect the power supply to the node when the power supply is turned ON.

According to an aspect of the invention, there is provided a solid state imaging device comprising: the output circuit described above; a plurality of pixels each of which stores a signal charge corresponding to an amount of received light; and a charge transferring portion that transfers the signal charge stored by each of the pixels to the charge detecting portion.

DETAILED DESCRIPTION OF THE INVENTION

An embodiment according to the invention will be described below with reference to the drawings.

Figure 1:
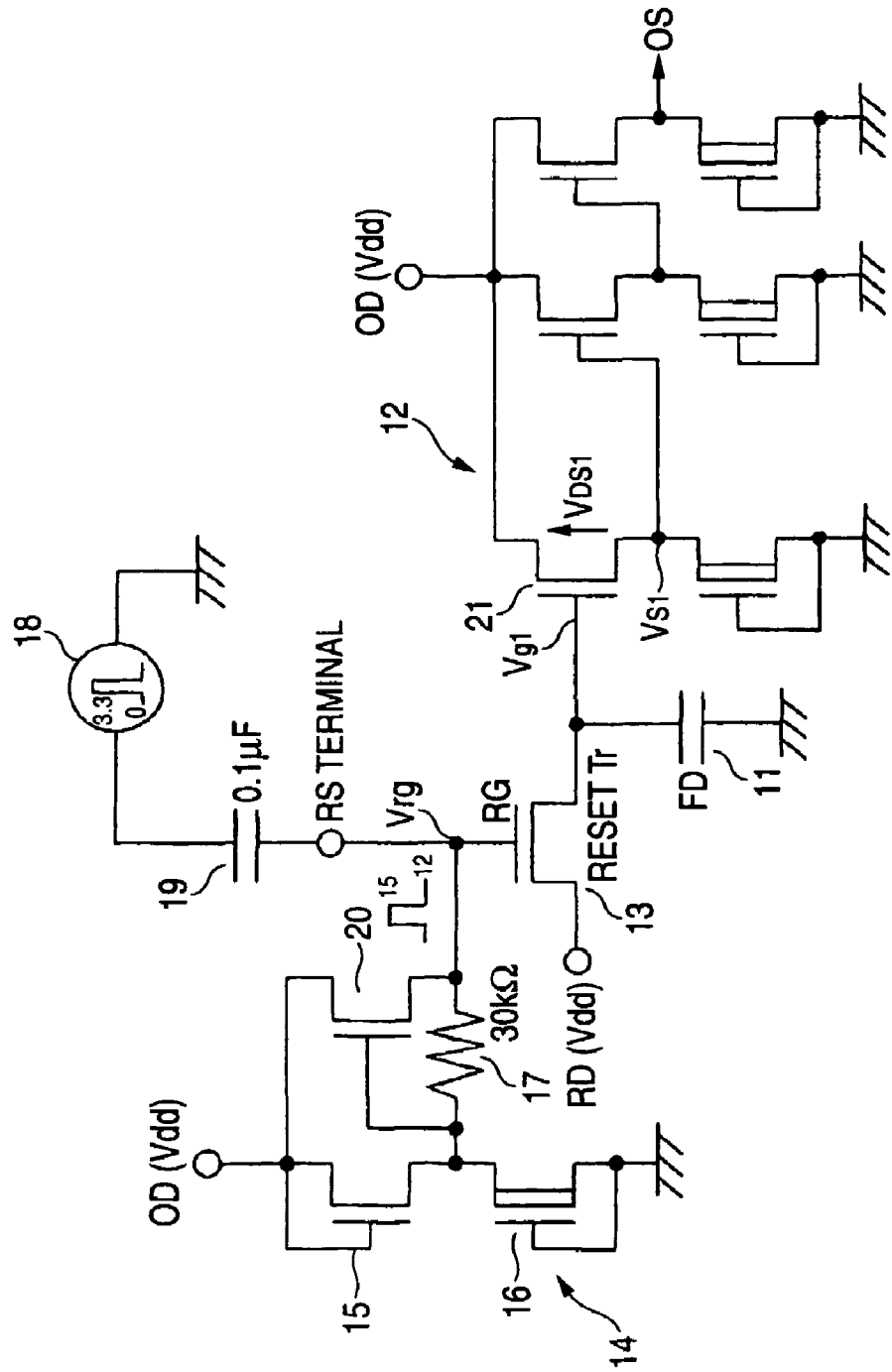
FIG. 1 is a circuit diagram showing an output circuit of a solid state imaging device according to an embodiment of the invention.

FIG. 1 is a circuit diagram showing an output circuit provided in a chip having a CCD type solid state imaging device formed therein according to an embodiment of the invention. Although a structure of the CCD type solid state imaging device itself is not shown in the drawing, it is possible to apply the output circuit according to the embodiment with a structure in which a signal charge is transferred along a charge transfer path and a voltage corresponding to an amount of the signal charge is detected by a charge detecting portion (a floating diffusion (FD) portion).

Figure 3:
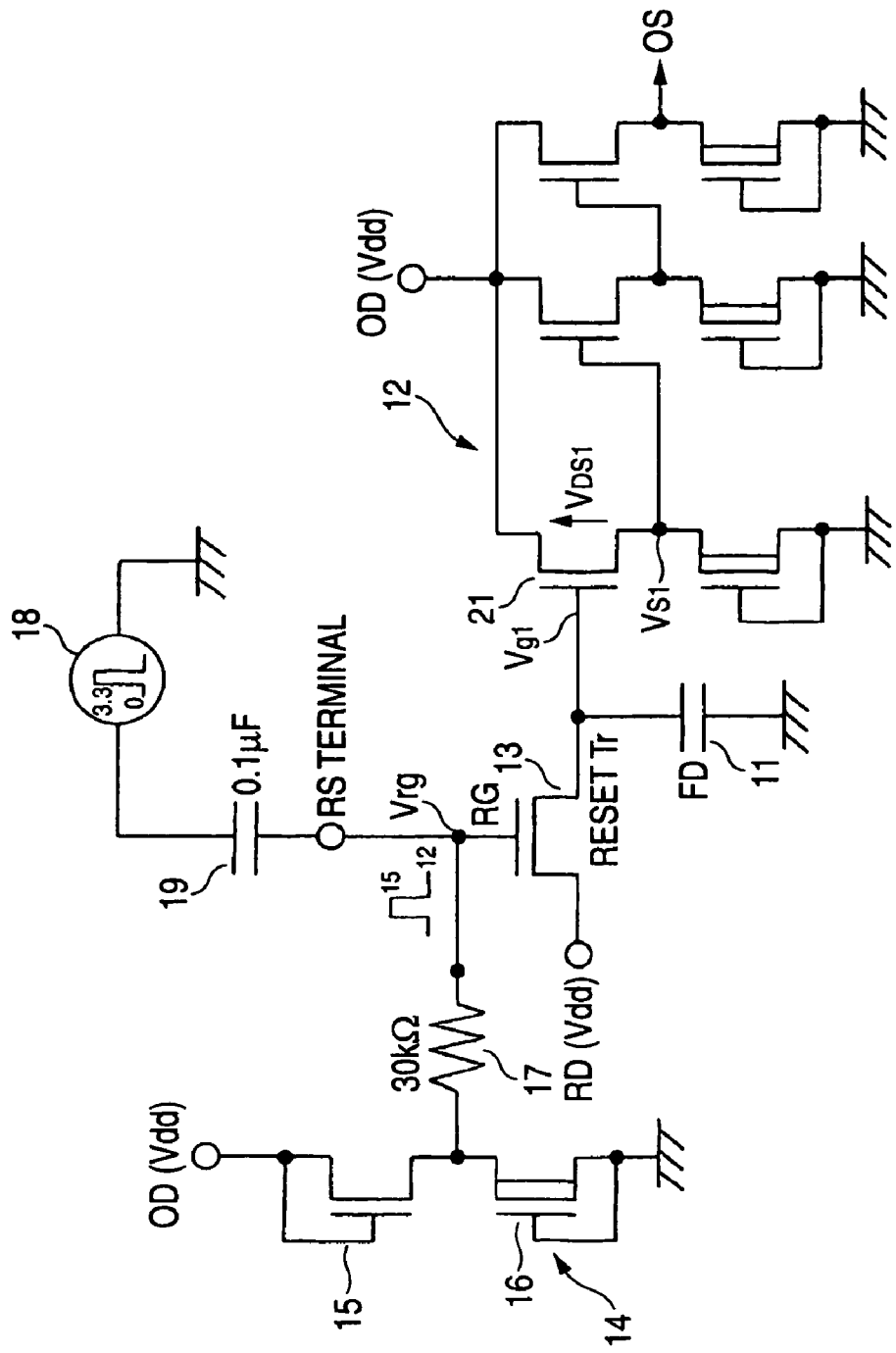
FIG. 3 is a circuit diagram showing the related-art output circuit.

The output circuit according to the embodiment is the same as the output circuit shown in FIG. 3 in that a three-stage source follower circuit 12 connected to an FD portion 11, a reset transistor 13 provided between the FD portion 11 and a rest drain RD, a bias voltage generating circuit 14 constituted by enhancement and depression type transistors 15 and 16 which are connected in series, a resistor 17 connected between a node of the transistors 15 and 16 and a reset gate RG of the reset transistor 13, and a reset pulse generator 18 to be an external circuit are connected to the reset gate RG through a coupling capacitor 19 and that 30 kΩ is used for a resistance value of the resistor 17 and 0.1 μF is used for a capacity of the coupling capacitor 19.

The output circuit according to the embodiment features that a protecting transistor 20 is added in parallel with the resistor 17 in addition to the structure of FIG. 3. The enhancement type MOS transistor 20 has a drain connected to a power supply OD, a source connected to the reset gate RG, and a gate connected to the node of the transistors 15 and 16.

In the output circuit according to the embodiment in which the protecting transistor 20 is provided, when a power supply is turned ON, an electric potential of the node of the transistors 15 and 16 is immediately raised so that the transistor 20 is turned ON. Consequently, a voltage of the power supply OD is supplied to the source of the transistor 20, that is, the reset gate RG and the coupling capacitor 19 connected to the reset gate RG is charged by the power supply through the transistor 20.

Therefore, a rise in the electric potential of the reset gate RG is slow in the output circuit of FIG. 3, while a rise in a voltage Vrg of the reset gate RG is quickened, a rise in a gate voltage Vg1 of an initial stage driver transistor 21 of the three-stage source follower circuit 12 is also quickened and a rise in a source voltage Vs1 of the transistor 21 is also quickened in the output circuit according to the embodiment.

Figure 2:
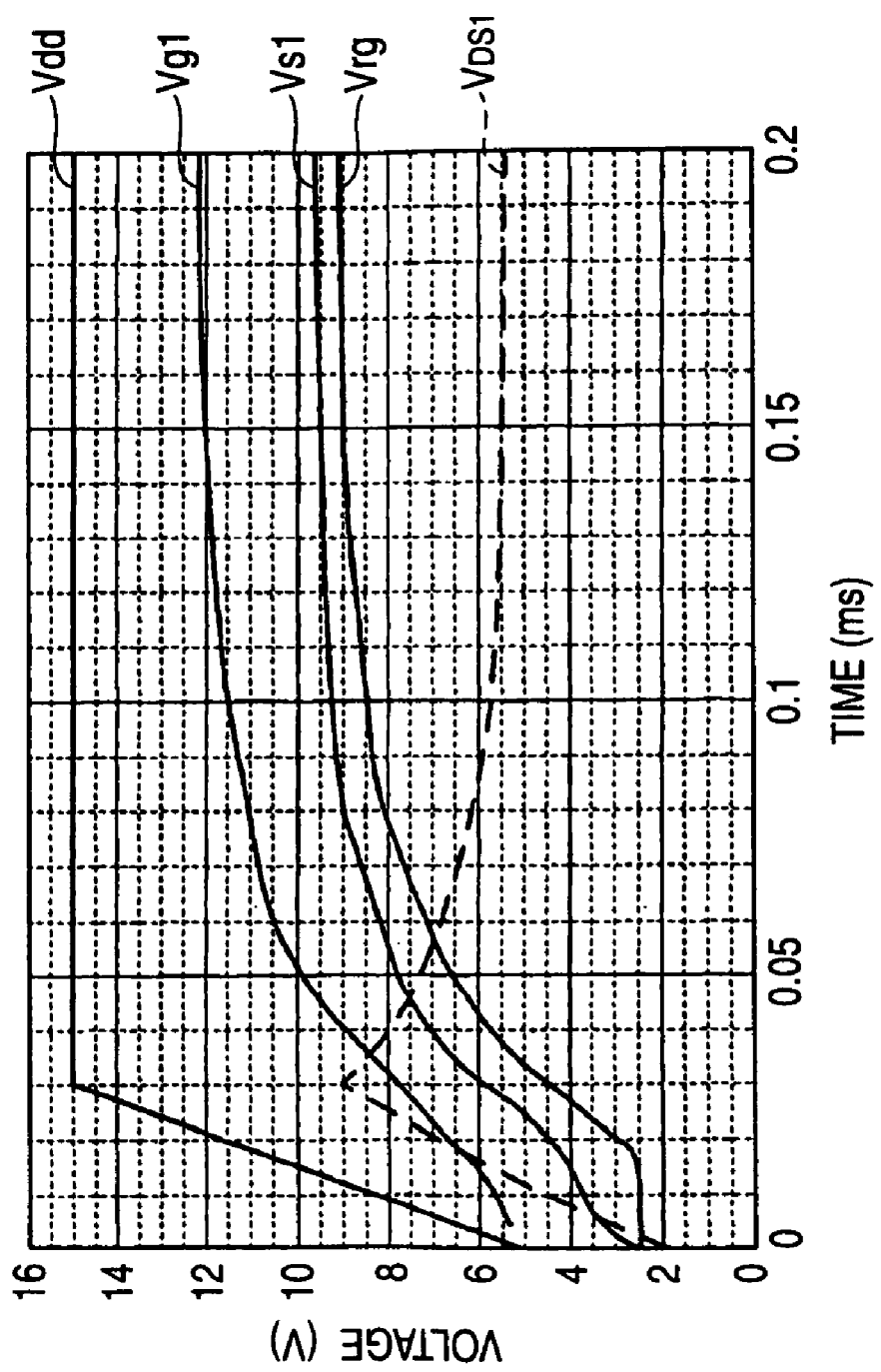
FIG. 2 is a graph showing a circuit simulation result of the output circuit illustrated in FIG. 1.
Figure 4:
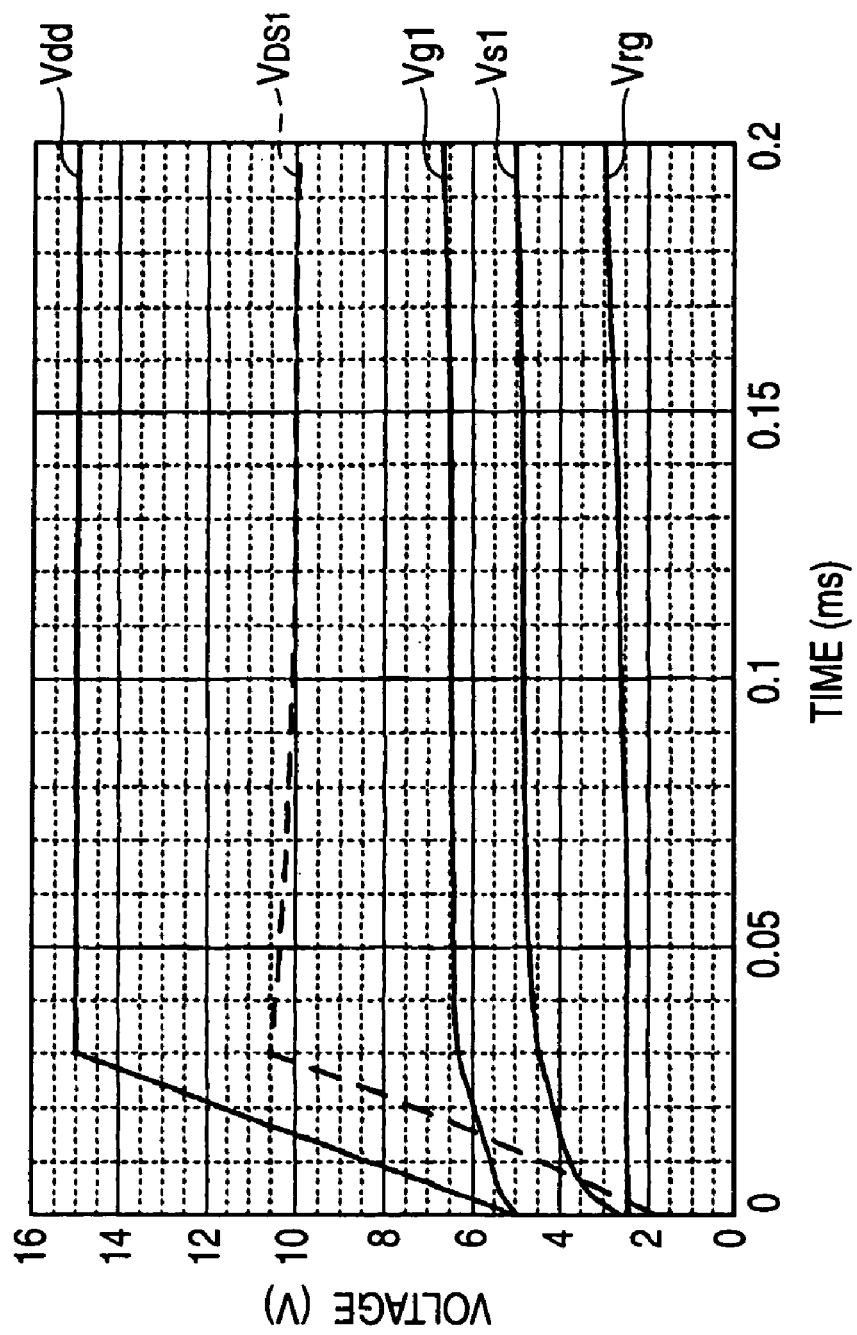
FIG. 4 is a graph showing a circuit simulation result of the output circuit illustrated in FIG. 3.
Figure 5:
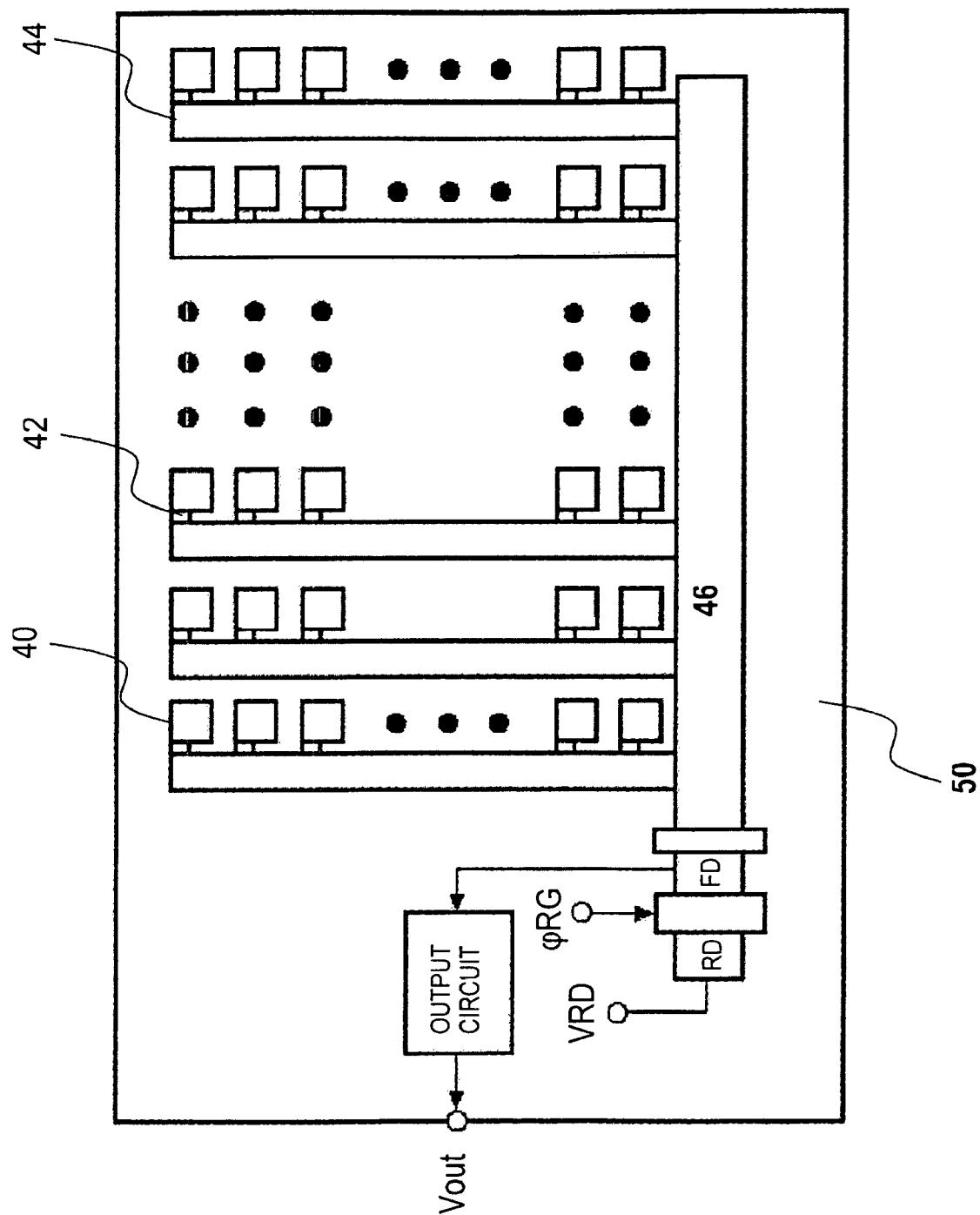
FIG. 5 illustrates a conventional CCD type solid state imaging device.

Accordingly, a voltage VDS1 between the source and the drain of the transistor 21 is dropped by approximately 3V as compared with the output circuit shown in FIG. 4 immediately after the power supply is turned ON as shown in a result of the simulation in FIG. 2.

In the output circuit according to the embodiment, therefore, it is possible to avoid a deterioration in a performance of the initial stage drive transistor 21. As a result, it is possible to prevent a deterioration in S/N of a pickup image.

While the MOS transistor has been used as a protecting device for charging the coupling capacitor connected to the reset gate RG by the power supply in the embodiment, the protecting operation can also be implemented by a diode.

A CCD type solid state imaging device usually has a structure in which a p well layer is formed on an n-type semiconductor substrate and each device is manufactured on the p well layer. Therefore, it is preferable to add a mask and a step for causing only a diode portion to have an n well structure in order to set an electric potential of a P portion of a PN unction in the diode to be other than 0 V. By setting the protecting device to be the MOS transistor as in the embodiment, it is not necessary to add the new mask and step.

According to the invention, the coupling capacitor is charged with a supply voltage through the projecting device. Therefore, a rise in a gate voltage of the reset transistor is quickened. Therefore, a rise in a source voltage of an initial stage drive transistor of the source follower circuit is quickened so that a voltage between a source and a drain in the initial stage drive transistor can be prevented from being increased. Consequently, a deterioration in a performance of the initial stage drive transistor can be avoided and a deterioration in S/N of a pickup image can be prevented.

Since the CCD type solid state imaging device and the output circuit according to the invention can avoid a deterioration in the performance of the transistor of the source follower circuit and can prevent a deterioration in S/N of a pickup image, they are useful as a solid state imaging device to be loaded onto a digital camera.

The entire disclosure of each and every foreign patent application from which the benefit of foreign priority has been claimed in the present application is incorporated herein by reference, as if fully set forth.

What is claimed is:

1. An output circuit of a solid state imaging device comprising:
   a source follower circuit that amplifies a voltage value signal, the voltage value signal being formed by a charge detecting portion in accordance with an amount of a signal charge stored by each of pixels, and outputs the amplified voltage value signal as a pickup image signal;
   a reset transistor that discards the signal charge in the charge detecting portion, which had been subjected to formation of the voltage value signal, to a reset drain in an application of a reset pulse;
   a bias voltage generating circuit that applies a bias voltage through a resistor to a gate of the reset transistor to which the reset pulse is applied from a reset pulse generating circuit through a coupling capacitor, the bias voltage being generated from a power supply; and a protecting device that applies a voltage of the power supply to a node of the gate and the coupling capacitor so as to charge the coupling capacitor by the power supply when the power supply is turned ON, wherein the protecting device is constituted by an MOS transistor which is connected in parallel with the resistor and is brought into a conducting state to connect the power supply to the node when the power supply is turned ON, wherein the bias voltage generating circuit comprises an enhancement type transistor and an depression type transistor that are connected in series, and wherein a drain of the protecting device is connected to the power supply, a source of the protecting device is connected to the node of the gate of the reset transistor and the coupling capacitor, and a gate of the protecting device is connected to a node of the enhancement type transistor and the depression type transistor.

2. A solid state imaging device comprising:
the output circuit according to claim 1;
a plurality of pixels each of which stores a signal charge corresponding to an amount of received light; and
a charge transferring portion that transfers the signal charge stored by each of the pixels to the charge detecting portion.

3. The output circuit of a solid state imaging device according to claim 1,
wherein the source follower circuit is a multi-stage source follower circuit.

4. The output circuit of a solid state imaging device according to claim 1, wherein the resistor is not directly connected to said reset drain.

5. The output circuit of a solid state imaging device according to claim 1, wherein the protecting device applies a voltage of the power supply to a node of the gate and the coupling capacitor so as to charge the coupling capacitor by the power supply through the protecting device when the power supply is turned ON.

* * * * *